United States Patent [19]

Fehr et al.

[11] 3,999,598
[45] Dec. 28, 1976

[54] WATER TEMPERATURE REGULATOR

[75] Inventors: Werner Fehr, Pflugfelden; Reinhold Weible, Stuttgart, both of Germany

[73] Assignee: Suddeutsche Kuhlerfabrik, Julius Fr. Behr, Stuttgard, Germany

[22] Filed: Jan. 14, 1975

[21] Appl. No.: 540,817

[30] Foreign Application Priority Data

Feb. 22, 1974 Germany .................. 2408508

[52] U.S. Cl. ............... 165/42; 123/41.02; 123/41.44; 237/12.3 B; 237/63

[51] Int. Cl.² ........................ B61D 27/00

[58] Field of Search ......... 123/41.02, 41.08, 41.29, 123/41.41, 41.51; 237/12.3 B, 63; 165/42, 35

[56] References Cited

UNITED STATES PATENTS

| | | | |
|---|---|---|---|
| 2,292,138 | 8/1942 | Lockhart et al. | 237/63 |
| 2,749,048 | 6/1956 | Edge | 237/12.3 B |
| 3,269,653 | 5/1964 | Howard | 237/12.3 B |
| 3,608,818 | 9/1971 | Von Fellenberg | 237/63 |
| 3,720,372 | 3/1973 | Jacobs | 123/41.44 |
| 3,779,307 | 12/1973 | Weiss et al. | 165/42 |
| 3,815,557 | 6/1974 | Piech et al. | 123/41.02 |

FOREIGN PATENTS OR APPLICATIONS

| | | | |
|---|---|---|---|
| 1,237,044 | 6/1960 | France | 123/41.02 |
| 1,154,777 | 6/1969 | United Kingdom | 237/12.3 B |

*Primary Examiner*—Charles J. Myhre
*Assistant Examiner*—Daniel J. O'Connor
*Attorney, Agent, or Firm*—Browdy and Neimark

[57] ABSTRACT

A device for the temperature regulation of water which is used in motor vehicle heating and air conditioning systems. This device contains a primary and a secondary circuit which is linked by a cruciform connector in a hydraulically switchable manner. The primary circuit includes a cooling circuit heat exchanger and a cooling water pump, with the secondary circuit containing a heater heat exchanger and a water pump driven by an electric motor.

13 Claims, 2 Drawing Figures

WATER TEMPERATURE REGULATOR

FIELD OF THE INVENTION

The invention relates to a device for temperature regulation of water, with particular application in motor vehicle heating and air conditioning systems.

BACKGROUND OF THE INVENTION

Control valves equipped with position adjustment are used for temperature control and regulation in motor vehicle heating and air conditioning systems. The most important known valve types are upper valves, cam valves and friction valves. Known position adjustment means include electric drive motors and pneumatic vacuum chambers utilizing a mechanical crank gear and the like. Relatively good results have been obtained in motor vehicle air conditioning systems especially with cam valves and directly coupled, electric-motor operated stepdown gearing.

A disadvantageous feature of these known devices is that they are characterized by close tolerances in the valve seats and drives. Consequently, manufacturing costs for these parts are relatively high.

Furthermore, the life of valve parts is largely dependent upon contamination in the water circuit. In addition, hostile environmental conditions under the hood tend to shorten service life.

SUMMARY OF THE INVENTION

Accordingly, it is an object of the present invention to overcome the defects of the prior art as stated above.

A further object is to produce a valveless device for the regulation of water temperature with particular use for motor vehicle heating and air conditioning systems.

Yet another object is to produce a regulator which utilizes a cruciform connector.

Still another object of the invention is to produce a device which is cheap and easy to manufacture.

This goal is achieved according to the invention substantially by virtue of the fact that a primary circuit (comprising a cooling circuit heat exchanger and a cooling water pump) and a secondary circuit (comprising a heater heat exchanger) are switchably interconnected by a cruciform connector.

The invention ensures that a purely hydraulically acting means instead of a mechanical sealant is used to completely disconnect the heater heat exchanger.

According to a further improvement of the invention, the primary circuit depends upon the rpm (revolutions per minute) of the engine and the secondary circuit depends upon volume, and both circuits are connected to the cruciform connector in the forward direction. In this manner, this cruciform connector acts as a hydraulic bridge.

According to a further advantageous feature of the invention, a water pump which is drivable by an electric motor is connected as an active adjusting means at the physically lowest point in the feed to the heater heat exchanger in the secondary circuit. The variable volume of water through the heater heat exchanger is controlled by varying the water pumps's rpm.

According to a further advantageous improvement of the invention, an overflow valve with a preset, constant opening in a valve plate is provided in the secondary circuit. The valve plate is spring-loaded and is displaced against the force of the spring at a specified higher pump pressure in such fashion that a complete cross sectional opening is achieved. A constant opening of approximately 3 mm in diameter will suffice to improve the characteristic curve of the pump in the load range of 0 to 80 percent. The overflow valve begins to open at a specified pump pressure or water volume, and is completely open at full load.

According to another feature of the invention it is advantageous to install the cruciform connector at the highest physical position in the two circuits. It is especially advantageous to mount this cruciform connector in the upper outlet from the heater heat exchanger.

A further advantageous improvement of the invention consists in installing a bypass line, with a current capacity limited at the top end, between the return from the heater heat exchanger and the suction side of the pump. The current capacity is advantageously limited so that the maximum capacity is equal to the required secondary water flow at a 70 percent heat load.

In a preferred sample embodiment of the invention, modulation of the water pump's rpm is effected by an electronic regulator which varies the voltage to the pump motor as a function of one or more temperatures, such as the air outlet temperature, the inside temperature, the outside temperature and the water inlet temperature. Thus, the electronic temperature regulator acts as a voltage regulator to continuously control the rpm of the electric motor.

In order to control the revolutions per minute of the permanent-magnet electric pump, the electronic temperature regulator includes a negative voltage feedback resistor and a positive current feedback resistor. This controlled current and voltage feedback enables the variable pump's rpm to be independent of torque. Thus, the voltage control has a positive current feedback superimposed upon it which compensates for the torque-produced rpm drop of the permanent-magnet DC motor by increasing the voltage to the motor. On the input side, the electronic temperature regulator may be operated with one or more temperature sensors.

Further advantages can be realized if, according to a further feature of the invention, the electronic regulator is provided with additional outputs with fixed or adjustable switching thresholds to control solenoid valves and relays. These solenoid valves and relays are intended to control the air conditioning system, wherein in particular, air flap adjustments and blower rpm control can be effected as a function of the input signals, i.e., of the sensor temperatures.

It is particularly advantageous according to another embodiment of the invention if a zener diode and series resistance are provided to stabilize the control voltage.

Further features and advantages of the invention will be seen in greater detail in the drawings which show sample embodiments in schematic form.

DETAILED DESCRIPTION OF A PREFERRED EMBODIMENT

Figure 1:
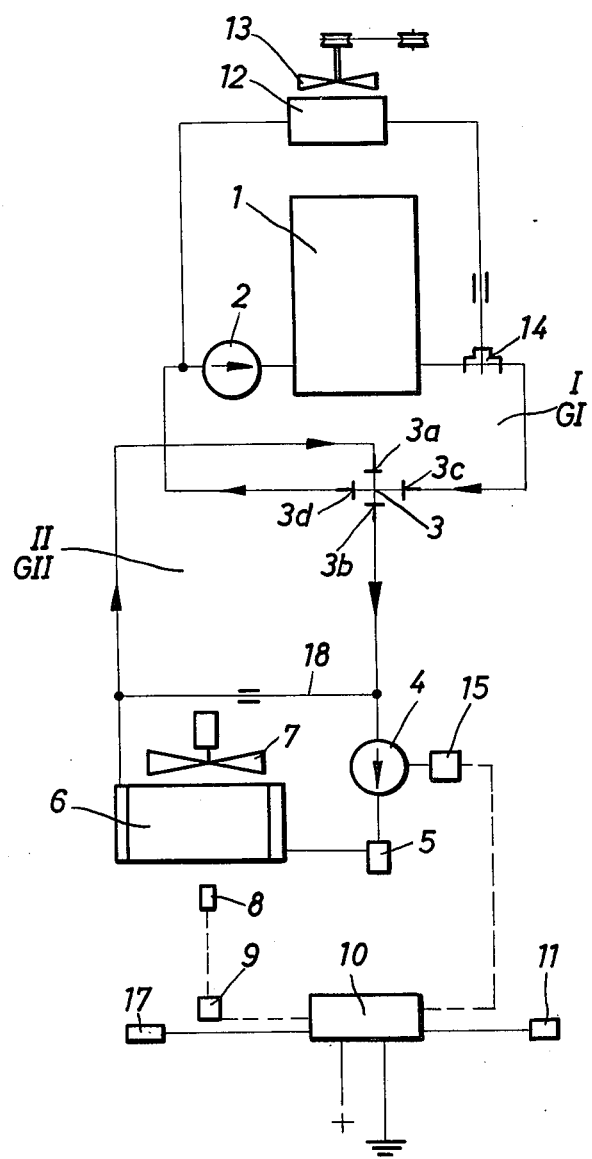
FIG. 1 is a schematic diagram of the entire invention.

FIG. 1 is a schematic diagram of the device according to the invention. An engine 1 has its cooling jacket (not shown) connected to a cooling circuit having a cooling circuit heat exchanger 12. A conventional type of thermostat 14 and a bypass line (not shown) can be provided in the circuit. An engine cooling water pump 2 is provided in the cooling circuit and is driven by the engine. A known cooling fan 13 is also provided in the circuit. The cooling circuit is provided with a primary circuit I, comprising the water-conducting parts of the engine 1 together with engine cooling water pump 2. Heating or air conditioning of the vehicle is effected by a secondary circuit II, comprising an electrically driven water pump 4, an overflow valve 5 and a heater heat exchanger 6. Heater heat exchanger 6 can also be provided with an electric fan 7.

Primary circuit I and secondary circuit II are linked by a cruciform connector 3 which serves as a hydraulic bridge. This connection is critical, since it produces no pressure differential between connecting points 3a and 3b when electric water pump 4 is shut off, regardless of the velocity and volume of the water in the primary circuit GI, and is therefore independent of the rpm of engine 1. Hence, only electric water pump 4 can produce a water flow GII in secondary circuit II.

Water volume GII is changed steadily to adjust the heating level, and consequently, GII is a function of the load on the heating system. At full heating volume, GII is equal to or less than GI. In this case, cruciform connector 3, because of the strictly symmetrical arrangement of its connections, diverts the water flow such that the flow from connection 3c is directed straight into connection 3b, and the flow from connection 3a is directed straight into connection 3d without any mechanical parts being used. In the lower, partial load region GI is greater than GII. Consequently, cruciform connector 3 assumes the function of a pressure regulator, but without any moving parts. When a very large volume of water flows in primary circuit I (on sudden acceleration, for example), this flow is diverted to connection 3d without affecting heating.

Progressive adjustment of water volume is required to achieve steady non-oscillating regulation. This is accomplished according to the invention by using an overflow valve 5 comprising a valve plate and pressure spring. This valve has a fixed aperture, which is approximately 3 mm in diameter for example, when the valve plate is closed. Pump 4 operates in the range from 0 to 70 percent against this aperture alone by modulation of the rpm. At a preset pump pressure, i.e., a given rpm, overflow valve 5 begins to open as the valve plate lifts, and is fully open at maximum pump rpm.

The rpm of the permanent-magnet electric motor 15 of electric water pump 4 is controlled by an electronic regulator 10. The rpm of pump 4 is controlled continuously from zero to its maximum as a function of the temperature of one or more sensors, such as outlet sensors 8, which consist advantageously of NTC (Negative Temperature Coefficient) resistors. The desired temperature can be set with the aid of an adjustable potentiometer 9.

Electronic regulator 10 is characterized by the fact that rpm is controlled by voltage and current feedback from permanent-magnet pump motor 15. This has the advantage that the required rpm will be ensured by increasing or decreasing the voltage to the motor (and hence the current through the motor) and therefore its torque. This is the case even at very low rpm and with varying friction in the pump shaft seal.

Pump 4 and heater heat exchanger 6 should be dimensioned and designed such that the system can vent itself without affecting the pump pressure of engine cooling water pump 2 of engine 1.

For this purpose it is advantageous to locate the feed of heater heat exchanger 6 at the bottom and the return at the top. The hydraulic bridge, in the form of cruciform connector 3, must be connected horizontally at the physically highest point, i.e., directly in the return hose. The water pump must be located at the level of the feed hose, or lower, so that the system can vent itself automatically upon starting.

It is especially advantageous if a bypass line 18 with a current capacity limited at the top end is provided between the return of heater heat exchanger 6 and the suction side of electric water pump 4. The maximum current capacity is approximately the same as the required secondary water flow at a 70 percent heater load.

Figure 2:
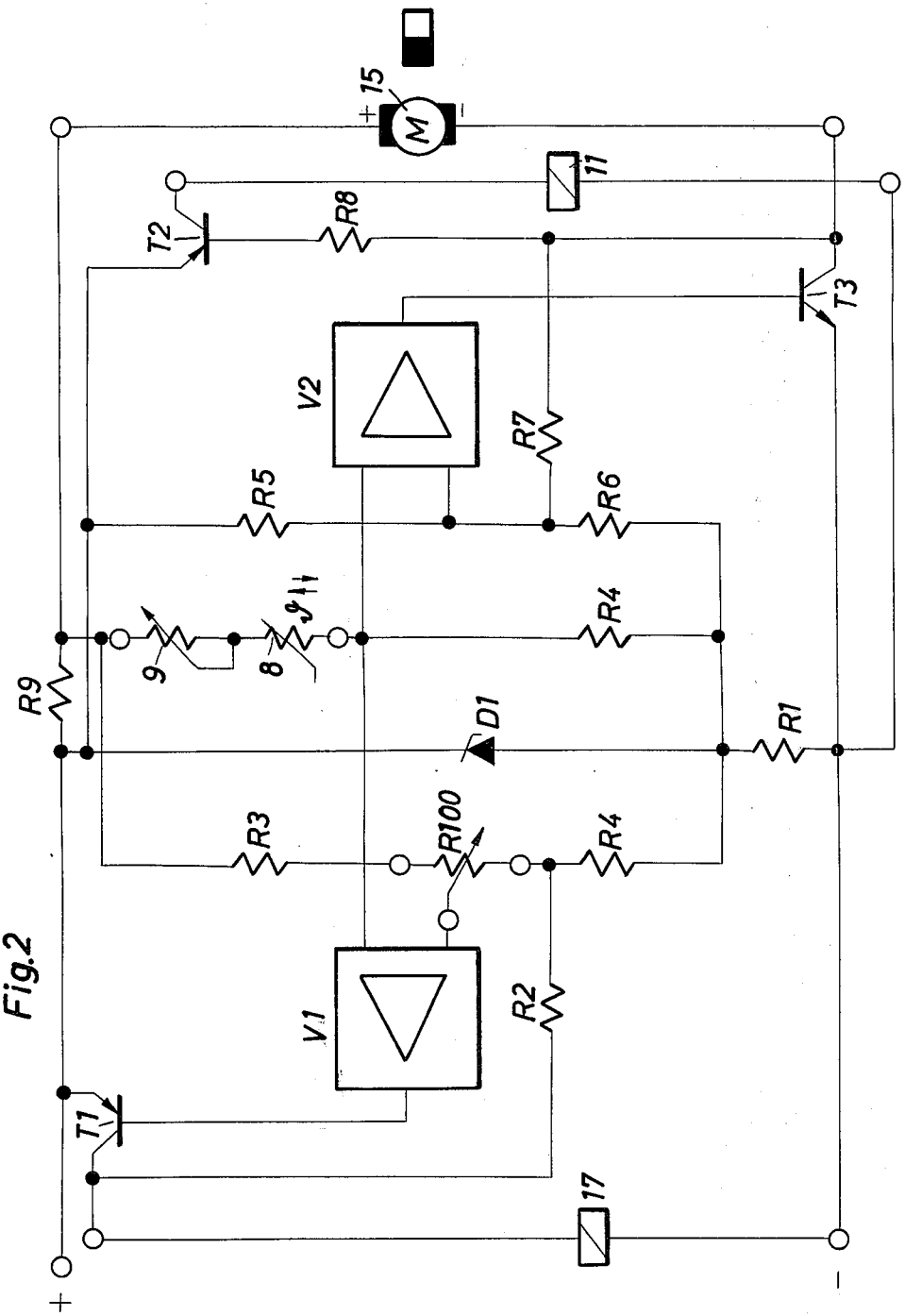
FIG. 2 is a schematic diagram of the electronic temperature regulation showing an rpm controlled electric water pump.

It is clear from the design of the electronic temperature regulator (whose schematic appears in FIG. 2) that the circuit initially operates as a voltage regulator through reverse feedback resistor R7. The voltage to electric motor 15 of electric water pump 4 is proportional to the deviation. The set value of the pump voltage is increased by the pump current (depending on the load) through a resistor R9.

This positive current feedback is calibrated so that the set value adjustment for the output voltage is adjusted to the load-dependent internal voltage drop in motor 15 by increasing the voltage to the pump motor. Because of the use of voltage regulation by positive current feedback, rpm control is achieved such that the pump rpm can be adjusted largely independently of load.

Motor 15 is connected to positive current feedback resistor R9. Diode D1 and resistor R1 serve to stabilize the control voltage. This enables the switching and operating points of the circuit to be largely independent of variations in the supply voltage. The circuit also has provisions for inserting solenoid valve 11 or relay 17 into it. Two switching thresholds are provided for this purpose. These thresholds consist of transistors T1 and T2 which control a solenoid valve, and a relay or other auxiliary assembly at a set pump rpm independent of the input signal from the sensor chain. The switching point T2 coincides with the starting point of pump motor 15. When pump 4 is running, T2 is connected. The switching point of T1 is adjustable over the entire proportional range of the circuit by means of a resistor R100.

Solenoid valve 11 and relay 17 allow general control of an air conditioning system, with special air flap adjustment and blower rpm control as a function of input signals.

The invention is not limited to the sample embodiments disclosed and described hereinabove. It also embraces all modifications made by experts as well as partial and subcombinations of the features and/or measures described and/or disclosed.

What is claimed:

1. In an apparatus for regulating water temperature of motor vehicle heating and air conditioning systems which include: a primary circuit having a portion thereof defined by part of an internal combustion engine, a cooling circuit heat exchanger and a cooling water pump; a secondary circuit having a heater heat exchanger and an rpm-controlled further water pump driven by motor means; the improvement comprising a cruciform connector with a symmetrical arrangement of connections switchably interconnecting said primary circuit and said secondary circuit purely hydraulically, thermostat means responsive to at least one operational temperature for developing a control signal and means for coupling the control signal to said motor means to keep the rpm of said further water pump constant independently of torque.

2. An improved apparatus according to claim 1, wherein water-volume in said primary circuit is dependent upon operating levels of said engine and said secondary circuit, both of said circuits being connected in a forward direction to said cruciform connector.

3. An improved apparatus according to claim 1, wherein said secondary circuit has a feed line with a physically lowest point, said motor means is an electric motor and said further water pump is an electric water pump, said electric water pump being driven by said electric motor and being connected to said physically lowest point in said feed line which goes to said heater heat exchanger in said secondary circuit.

4. An improved apparatus according to claim 3, wherein said secondary circuit contains an overflow valve with a preset constant aperture in a valve plate connected between said heater heat exchanger and said electric water pump, said valve plate being spring loaded and moving against spring force at a given pump pressure so that a complete cross sectional opening is produced.

5. An improved apparatus according to claim 1, wherein said secondary circuit and said primary circuit each have a physically highest point, said cruciform connector being installed horizontally in both said circuits at said physically highest point.

6. An improved apparatus according to claim 1, wherein said heater heat exchanger has an upper return, said cruciform connected being installed horizontally in said upper return of said heater heat exchanger.

7. An improved apparatus according to claim 1, further including a bypass line with a limited current capacity, said bypass line being installed between a return from said heat exchanger and said further water pump on its suction side.

8. An improved apparatus according to claim 7, wherein maximum current capacity in the bypass line is equal to required secondary water flow at 70 percent heater load.

9. An improved apparatus according to claim 1, wherein said thermostat means comprises an electronic temperature regulator connected to said motor means wherein revolutions per minute of said further water pump are regulatable or controllable by said electronic temperature regulator as a function of temperature.

10. An improved apparatus according to claim 9, wherein said electronic temperature regulator operates as a voltage regulator to continuously control the revolutions per minute of said motor means.

11. An improved apparatus according to claim 10, wherein said motor means is an electric motor, and further including current feedback means, said current feedback means superimposing feedback current on said electric motor, said feedback means compensating for torque-dependent rpm drop of said motor by increasing voltage to said motor.

12. An improved apparatus according to claim 9, further including a solenoid and a relay both connected to said regulator, said electronic regulator being provided with additional outputs with fixed or adjustable switching thresholds to control said solenoid valve or said relay.

13. An improved apparatus according to claim 9, wherein said motor means is an electric motor, and further including a zener diode and a series resistor connected across said motor to stabilize the control voltage.

* * * * *

UNITED STATES PATENT AND TRADEMARK OFFICE
CERTIFICATE OF CORRECTION

PATENT NO. : 3,999,598
DATED : December 28, 1976
INVENTOR(S) : Fehr et al

It is certified that error appears in the above—identified patent and that said Letters Patent are hereby corrected as shown below:

Title page, [73] correct the name of assignee to read as follows: --Süddeutsche Kühlerfabrik, Julius Fr. Behr, Stuttgart, Germany--

Signed and Sealed this

Seventeenth Day of May 1977

[SEAL]

Attest:

RUTH C. MASON
*Attesting Officer*

C. MARSHALL DANN
*Commissioner of Patents and Trademarks*